(12) United States Patent
Ruma

(10) Patent No.: US 11,971,971 B2
(45) Date of Patent: *Apr. 30, 2024

(54) ACKNOWLEDGMENT AUTHENTICATION SYSTEM AND METHOD

(71) Applicant: LAD Verification Services, LLC, Hilliard, OH (US)

(72) Inventor: David C. Ruma, Powell, OH (US)

(73) Assignee: LAD Verification Services, LLC, Hilliard, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,490

(22) Filed: Sep. 8, 2021

(65) Prior Publication Data

US 2021/0406355 A1    Dec. 30, 2021

Related U.S. Application Data

(63) Continuation of application No. 16/139,327, filed on Sep. 24, 2018, now Pat. No. 11,132,426, which is a continuation of application No. 15/645,590, filed on Jul. 10, 2017, now Pat. No. 10,108,795, which is a continuation of application No. 14/963,406, filed on Dec. 9, 2015, now Pat. No. 9,727,718, which is a continuation of application No. 14/291,139, filed on May 30, 2014, now Pat. No. 9,240,990.

(60) Provisional application No. 61/829,702, filed on May 31, 2013.

(51) Int. Cl.
| | | |
|---|---|---|
| G06F 21/32 | (2013.01) | |
| G06F 3/0484 | (2022.01) | |
| G06F 21/34 | (2013.01) | |
| G06V 40/16 | (2022.01) | |
| G06V 40/50 | (2022.01) | |
| H04L 9/40 | (2022.01) | |

(52) U.S. Cl.
CPC ............ *G06F 21/32* (2013.01); *G06F 3/0484* (2013.01); *G06F 21/34* (2013.01); *G06V 40/172* (2022.01); *G06V 40/50* (2022.01); *H04L 63/0861* (2013.01); *G06F 2221/2111* (2013.01)

(58) Field of Classification Search
CPC ........ G06F 21/32; G06F 21/34; G06F 3/0884; G06F 3/0484; H04L 63/0861
USPC .......................................................... 726/28
See application file for complete search history.

(56) References Cited

U.S. PATENT DOCUMENTS

| | | | |
|---|---|---|---|
| 7,127,406 B2 | 10/2006 | Triola | |
| 8,204,807 B2 | 6/2012 | Triola | |
| 8,228,299 B1 | 7/2012 | Maloney et al. | |
| 8,457,367 B1* | 6/2013 | Sipe ........................ | G06F 21/32 382/118 |
| 8,468,580 B1* | 6/2013 | Casey ................... | G06F 21/606 726/4 |
| 8,531,424 B1 | 9/2013 | Maloney et al. | |
| 8,547,356 B2 | 10/2013 | Maloney et al. | |
| 9,240,990 B1* | 1/2016 | Ruma .................. | G06V 40/172 |
| 9,727,718 B2 | 8/2017 | Ruma | |

(Continued)

*Primary Examiner* — Teshome Hailu
(74) *Attorney, Agent, or Firm* — Jason H. Foster; Kremblas & Foster

(57) ABSTRACT

The present invention is a system for and method of enabling an initiating party to capture, store, and retrieve an image of at least one acknowledging party performing an acknowledgement requested by the initiating party where the acknowledging party(s) may be remotely located from the initiating party.

8 Claims, 13 Drawing Sheets

(56) References Cited

U.S. PATENT DOCUMENTS

| | | |
|---|---|---|
| 10,108,795 B2 | 10/2018 | Ruma |
| 2004/0268131 A1 | 12/2004 | Kudo et al. |
| 2006/0092948 A1 | 5/2006 | Katz et al. |
| 2009/0077386 A1* | 3/2009 | Simonian ............... H04L 9/3231 |
| | | 713/176 |
| 2010/0013676 A1* | 1/2010 | Do ...................... G06F 3/04883 |
| | | 341/20 |
| 2010/0082490 A1 | 4/2010 | Rosenblatt et al. |
| 2010/0332265 A1 | 12/2010 | Smith |
| 2012/0258773 A1* | 10/2012 | Alvarez Rivera .... G06F 1/1656 |
| | | 726/19 |
| 2012/0297190 A1 | 11/2012 | Shen et al. |
| 2013/0167212 A1* | 6/2013 | Azar ...................... G06F 21/32 |
| | | 348/77 |

* cited by examiner

ACKNOWLEDGMENT AUTHENTICATION SYSTEM AND METHOD

CROSS-REFERENCES TO RELATED APPLICATIONS

This application is a continuation of U.S. patent application Ser. No. 16/139,327, filed on Sep. 24, 2018 (now United States Patent No., issued on), which is a continuation of U.S. patent application Ser. No. 15/645,590, filed on Jul. 10, 2017 (now U.S. Pat. No. 10,108,795 issued on Oct. 23, 2018), which is a continuation of U.S. patent application Ser. No. 14/963,406, filed on Dec. 9, 2015 (now U.S. Pat. No. 9,727,718 issued on Aug. 8, 2017), which is a continuation of U.S. patent application Ser. No. 14/291,139, filed May 30, 2014 (now U.S. Pat. No. 9,240,990 issued on Jan. 19, 2016), which claims priority to provisional application 61/829,702, filed May 31, 2013. All of the above applications are incorporated herein by reference in their entirety.

BACKGROUND AND SUMMARY OF THE INVENTION

Exemplary embodiments of the present invention relate generally to a system and method for verifying the identity of a party acknowledging a document or other agreement.

Known methods of verifying the identity of a person acknowledging a document generally consist of a system of witnesses, such as the use of a notary public. With the increasing amount of business transactions occurring remotely over the Internet, a method is needed to verify the identity of the person signing or assenting to an agreement when the signing or assenting takes place remotely to available witnesses.

When conducting business over the Internet or other type of remote transaction, accepting the terms and conditions of an agreement may be accomplished by any of several methods. Examples of these methods include: selecting a checkbox, clicking on an "I agree" or similar button, typing the user's name as a signature, or using a mouse, finger, or stylus as a signature or acknowledgment. While methods such as these have generally been found adequate to assent to the terms of an agreement, the methods themselves don't perform any significant level of authentication and may leave a party to the transaction susceptible to claims that the other party did not perform the claimed authentication.

Known methods of authentication of Internet or other types of remote transactions and agreements generally involve a user enrolling for an authentication service by selecting a username and password. Certain known authentication methods may require the user to provide additional information such as email addresses, physical addresses, or telephone numbers. When using such a method to authenticate a user, that user generally must log onto the system and enter a username and password. The system may then use a method of encrypting the information from the connection between the user and the recipient of the system to insure that at least the computing device connected to the system was caused to be connected by someone previously identified. Despite the required information, the person or organization asking for an acknowledgement is not able to authenticate that the person enrolling for the service is actually who he says he is. The present invention provides a system and method for visual authentication of the person who is accepting the terms of an agreement by "signing" or other methods as described earlier.

In an embodiment of the invention, a computing device may be configured to authenticate a person or persons acknowledging an agreement by capturing images, using a digital image capture device, of such person or persons as they perform the acknowledgement. Such an image device may be configured to capture single images or a continuous stream of images that result in a video recording. In another embodiment of the invention, a first computing device, such as a computer server, connected via a network to a second computing device may be configured to send instructions to the second computing device. Those instructions may configure the second computing device to capture images to be used to authenticate a person or persons acknowledging an agreement. In another embodiment of the invention, a computing device may be configured to restrict the time during which a user is permitted to acknowledge an agreement. In another embodiment of the invention, a computing device may be configured to generate random codes which are then provided to a user as part of a user authentication process. In another embodiment of the invention, a computing device may be placed in electronic communication with a device for recording biometric information from the user. The computing device may be configured to store this biometric information along with other types of authentication information recorded during the acknowledgment process to allow for further user authentication capabilities. In another embodiment of the invention, a computing device may be configured to perform the above described image capture functions when the computing device is not connected to an external data network. In this embodiment, the computing device may store images and other information related to an acknowledgement process for later delivery to an external server or computing device. In another embodiment of the invention, a first computing device may be configured to provide information related to an acknowledgment directly to a second computing device, without the requirement of a server to receive and store the information. In other embodiments of the invention, a computing device used in the authentication process may be authenticated by a second computer device or computer server to confirm that the first computer device is associated with the person or entity performing the acknowledgment. In certain embodiments of the invention, a person or party wishing to use the invention to acknowledge an agreement or other document may be required to provide additional evidence of their identity through the use of an identification document containing a photographic image. In such a manner, a party or organization that wishes to authenticate the acknowledging party may compare the provided identification document to images recorded during the acknowledgement process in order to confirm the identity of the authenticator. In some embodiments of the invention, the location from which a computer device is used to perform an acknowledgement may be restricted to certain predetermined locations. Alternatively, certain locations may be expressly excluded. For example, a party or organization may be restricted from authentication outside a certain state, region, or country in order to comply with legal requirements applicable to a particular agreement to be authenticated.

In addition to the novel features and advantages mentioned above, other benefits will be readily apparent from the following descriptions of the drawings and exemplary embodiments.

BRIEF DESCRIPTION OF THE SEVERAL VIEWS OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE INVENTION

Various embodiments of the present invention will now be described in detail with reference to the accompanying drawings. In the following description, specific details such as detailed configuration and components are merely provided to assist the reader's overall understanding of these embodiments. Therefore, it should be apparent to one skilled in the art that various changes and modifications of the embodiments described herein can be made without departing from the scope and spirit of the present invention. In addition, descriptions of well-known functions and constructions may be omitted for clarity and conciseness.

As used herein, the term "agreement" is used to refer to an agreement, contract, offer, terms and conditions, or other writings that represent the intent of a party or parties to a transaction or other type of understanding. It should be understood that the use of "agreement" is not intended to restrict the use or applicability of the invention to contracts or other written agreements. For example, a party entering information into an electronic database may be authenticated using an embodiment of the invention.

As used herein, the term "user" is defined as a party who wishes to assent to an agreement and uses the method or system described herein to do so.

As used herein, the term "initiator" is defined as a party who uses an embodiment of the invention to authenticate the signature or other method of assenting to an agreement by a user.

As used herein, the term "image" may represent a single image or may represent a series of images which form a video representation of the subject of the images.

Exemplary embodiments of the present invention are directed to a method and apparatus for authenticating a user's assent to an agreement. Particularly, a method and apparatus for authenticating a user's assent to an agreement that may be performed using a computing device. Computing devices may include, but are not limited to, desktop computers, laptop computers, smart phones, tablet computers, networked computer servers, and other computerized devices which may be equipped with image capture hardware. Hereinafter, it is assumed that a method and apparatus for authenticating a user's assent to an agreement according to the present invention are applied to a computing device.

Figure 1:
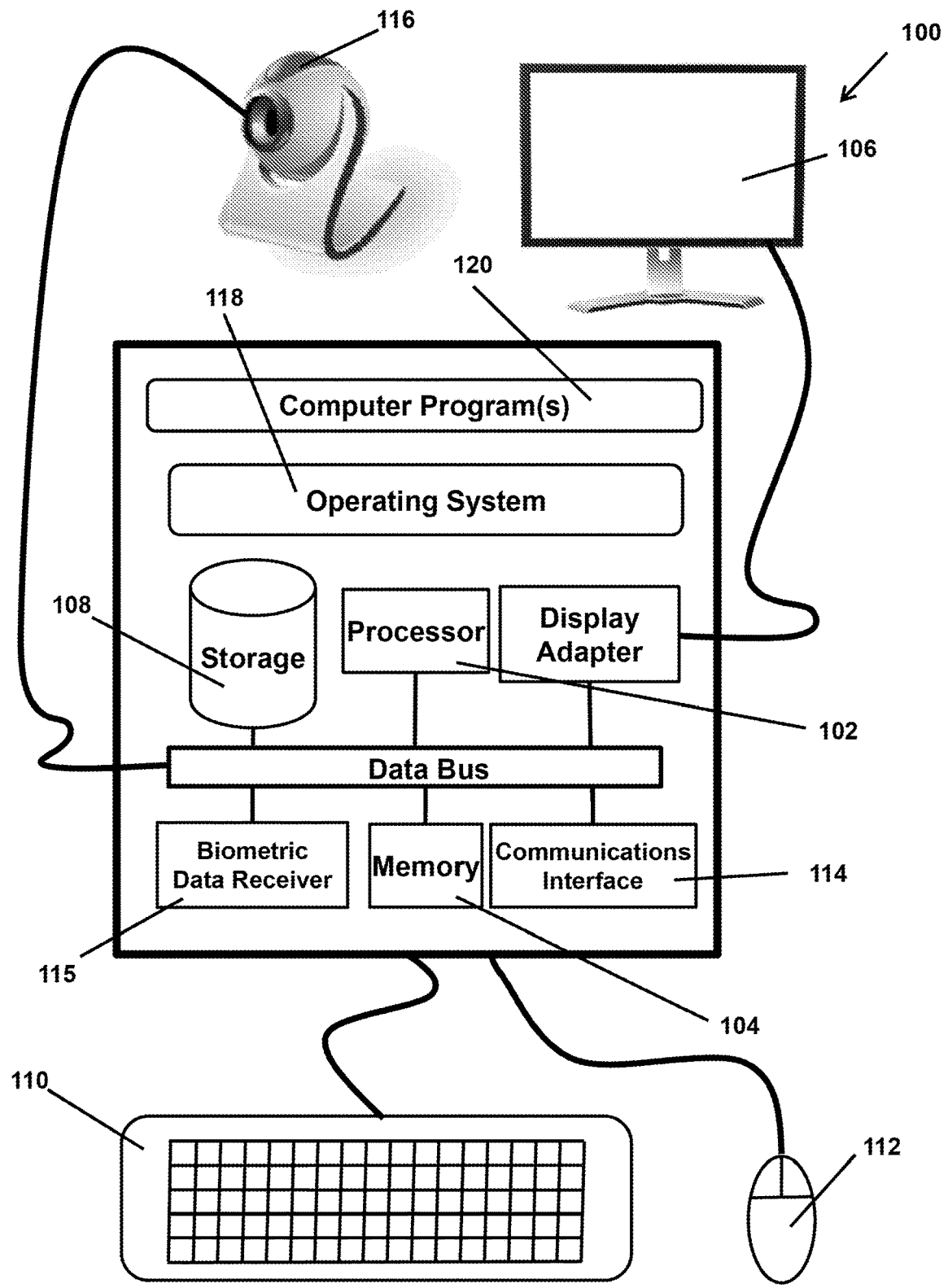
FIG. 1 is a diagram of a computing device used in an embodiment of the invention.
Figure 2:
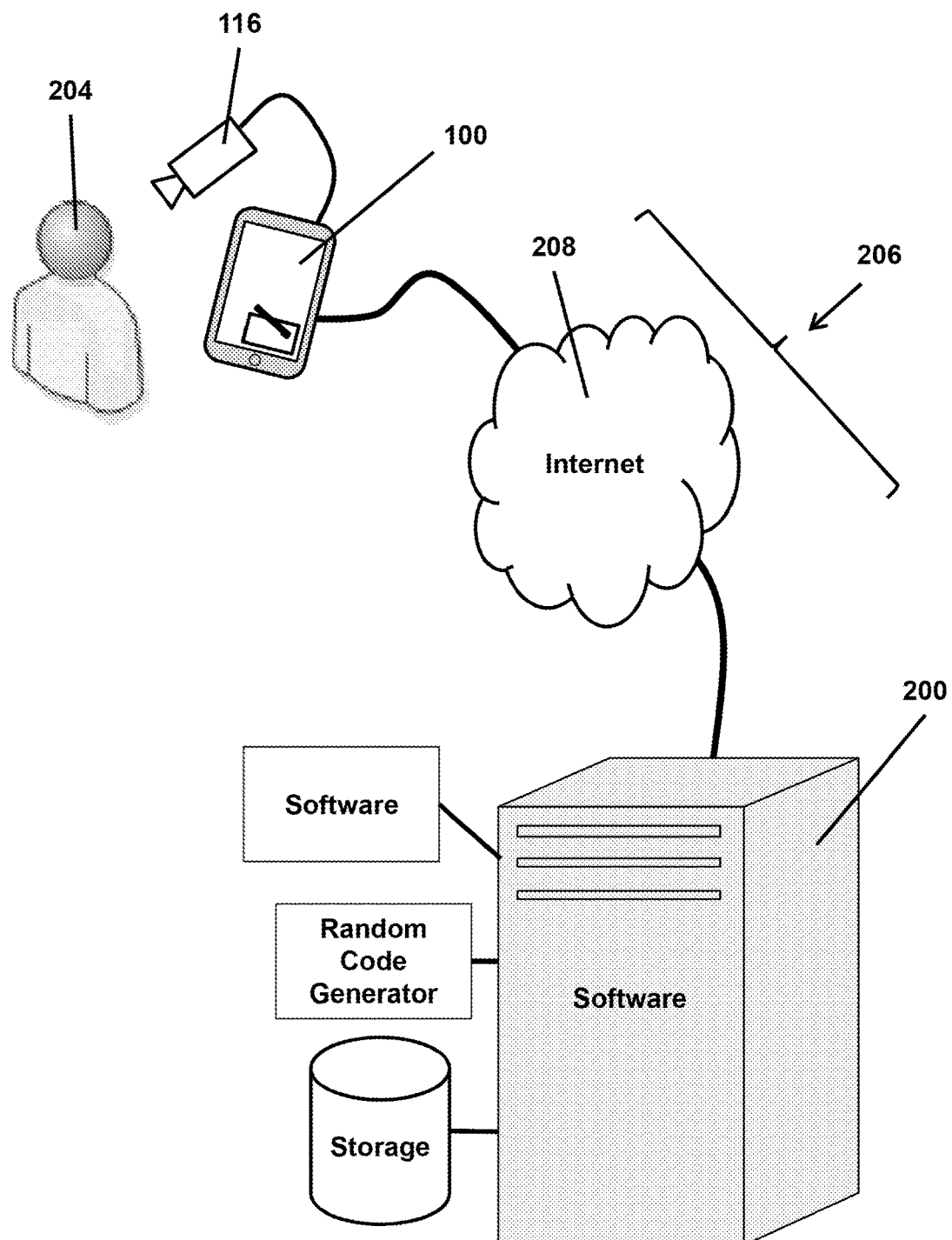
FIG. 2 is a diagram of a user interacting with an embodiment of the invention.
Figure 3:
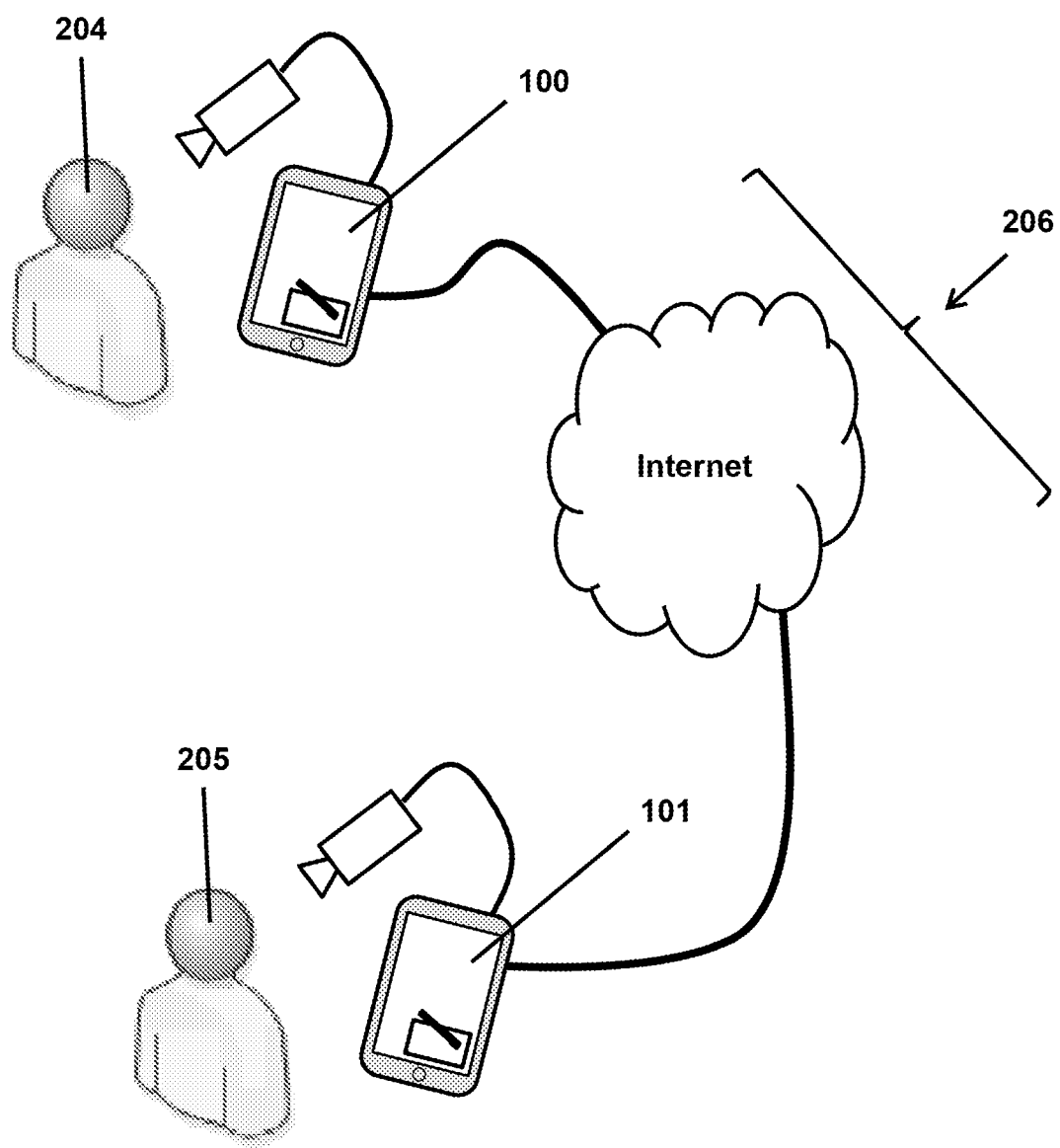
FIG. 3 is a diagram of a user interacting with an embodiment of the invention that comprises a second user computing device.

FIG. 1 is a block diagram illustrating a computing device according to an embodiment of the present invention. Referring to FIG. 1, a computing device 100 may comprise a processor 102, a memory 104, a display device 106, a storage device 108 such as a disk drive, input devices 110 and 112, a communications interface 114, a biometric data receiving device 115, an image capture device 116, an operating system 118, and at least one software program 120. In embodiments in which the computing device is a smart phone, tablet, or other such device, the user input devices may be touch sensitive display devices or integral keyboards. As illustrated in FIG. 2, embodiments of the invention may comprise at least one computer server 200, which may be located remotely from a computing device 100 with which a user 204 interacts. In such an embodiment, the computer server 200 may be in communication with the computing device through a network 206. Such a network may be comprised of a plurality of networks connected together to form a wide area network such as the Internet 208. These networks also may comprise wireless components such as cellular data and Wi-Fi networks. As illustrated in FIG. 3, other embodiments of the invention may comprise a first computing device 100 which is in communication with a second computing device 101 using a network 206. Such a network may be comprised of a plurality of connected networks as described above for FIG. 2. FIG. 3 illustrates that embodiments of the invention need not comprise a server component but instead may consist of two or more computing devices as illustrated. In addition to what is shown in FIGS. 2 and 3, other embodiments of the invention may be comprised of additional computing devices such that a plurality of users may be authenticated for a particular agreement without requiring each user to perform the authentication process on the same computing device. In such a manner, users may be authenticated from a plurality of different locations for one or more agreements.

In certain embodiments of the invention, software may be installed on the user's computing device when the device is initially configured to perform according to an embodiment of the invention. In other embodiments, such software may be communicated from a computer server to the computing device on an "on-demand" basis each time the computing device is caused to be in communication with the computer server. In some embodiments, software may be installed on a computing device when the device is initially configured to perform according to such embodiments of the invention where such software performs only a portion of the invention where such portion configures the computing device to receive additional software instructions from a computer server when the computing device is used to perform an embodiment of the invention.

Figure 4A:
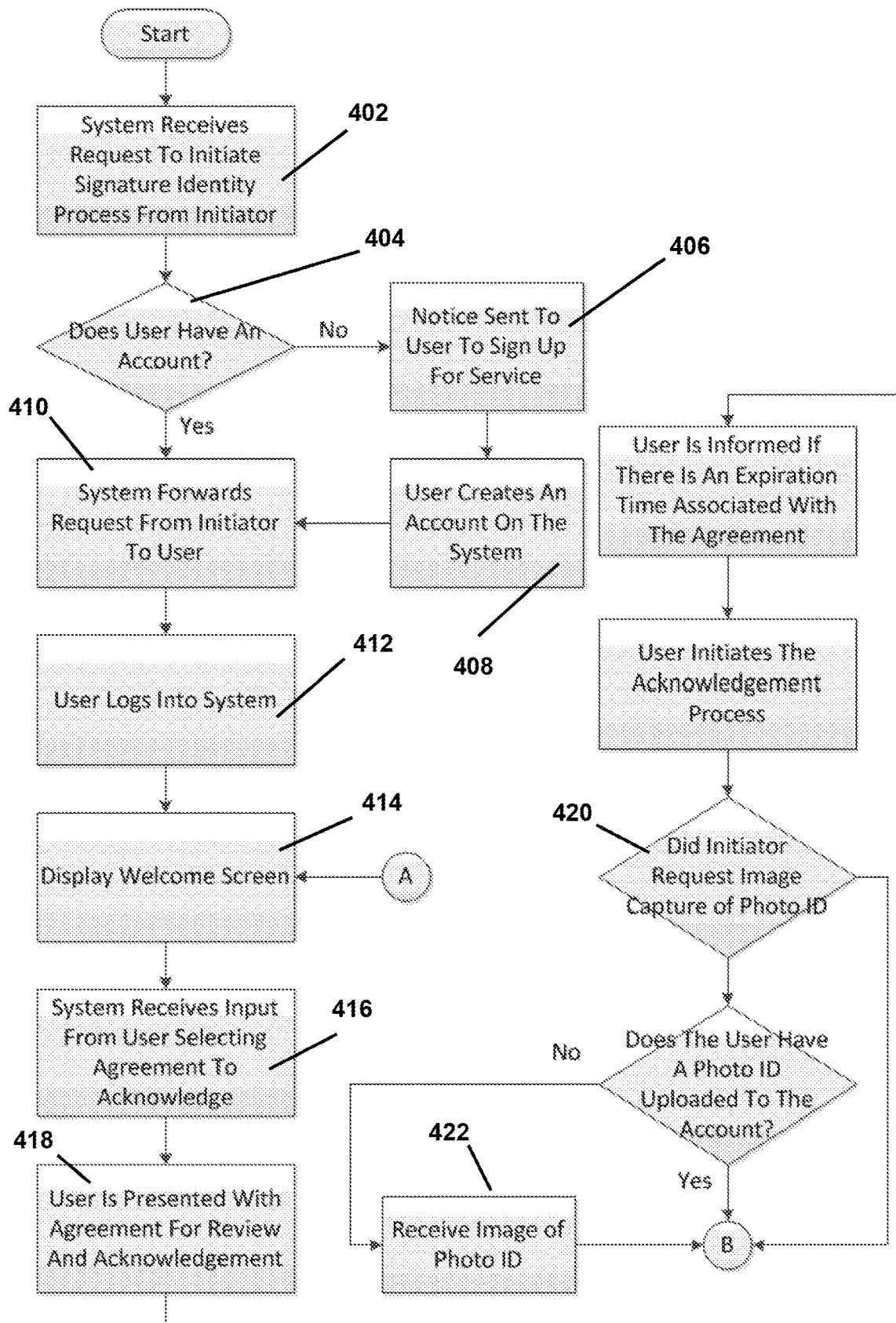
FIGS. 4a-4c are flow charts of an acknowledgment process used by an embodiment of the invention.
Figure 4B:
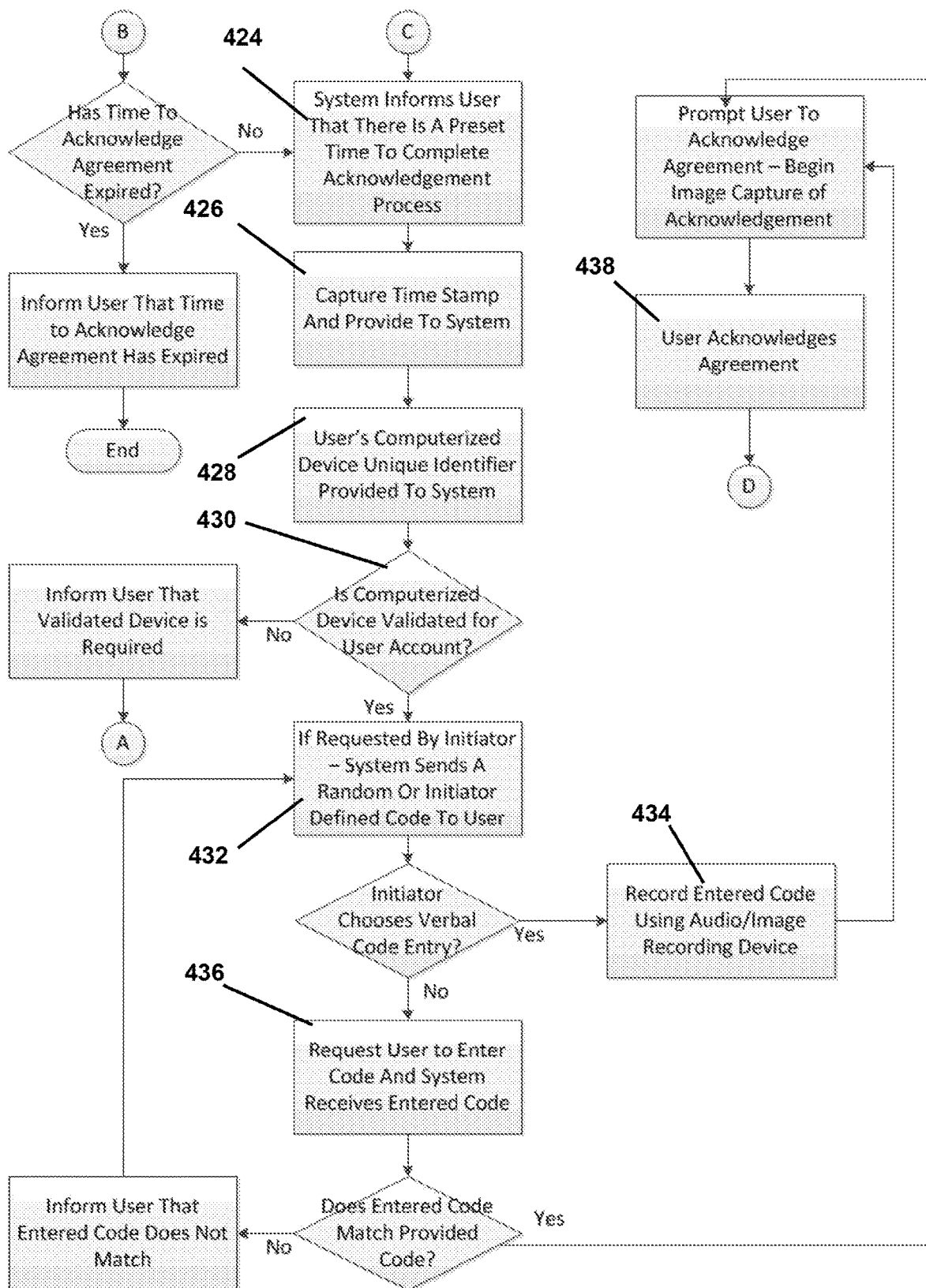
Figure 4C:
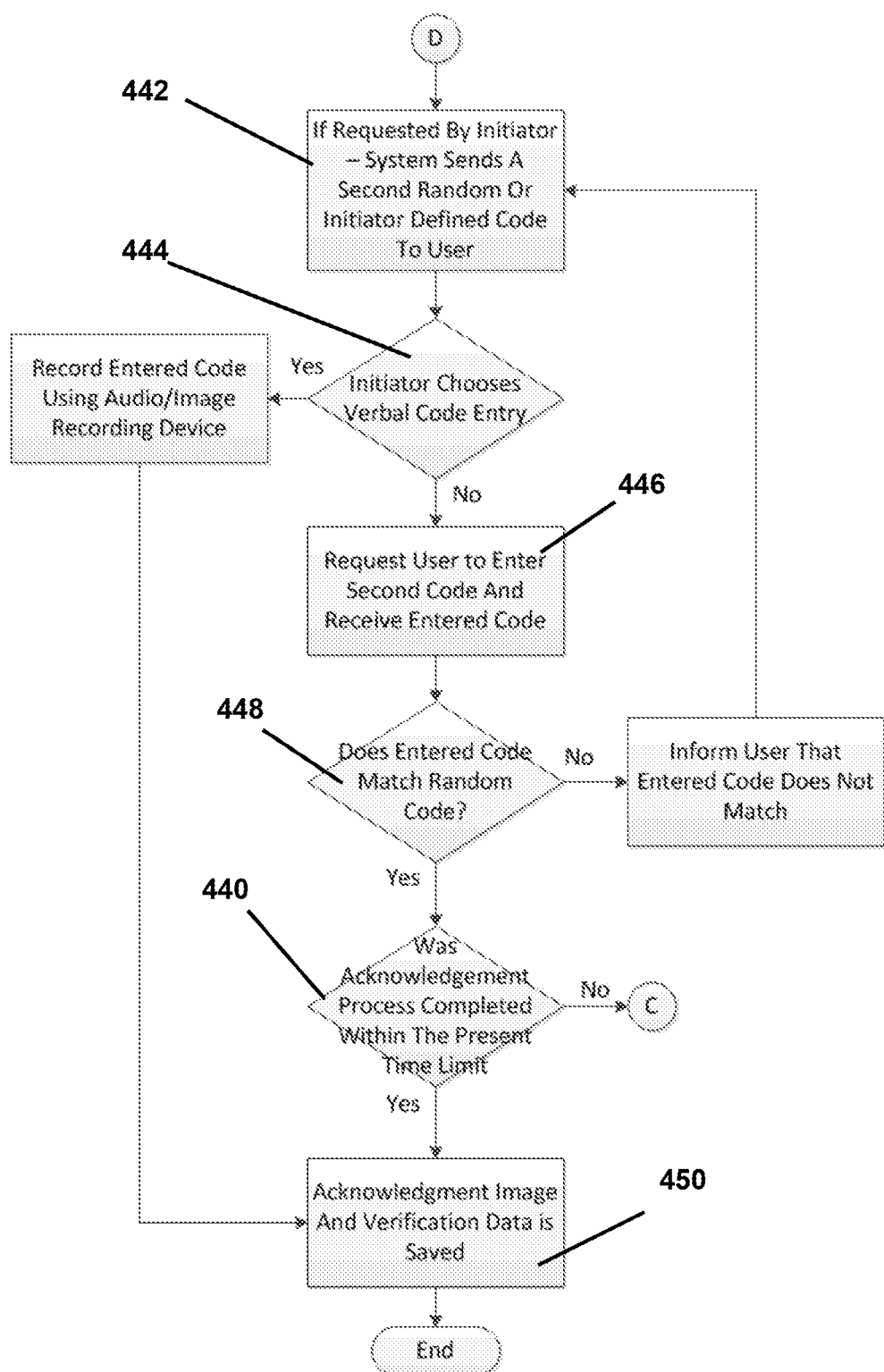

FIGS. 4a-4c are a flow chart of the main steps in an algorithm which functions to perform an embodiment of the invention. One skilled in the art will realize that not all steps need to be taken and that not all steps need be performed in the order shown for one to practice certain embodiments of the invention. In addition, some of the steps illustrated may be optional depending upon how the initiating party or organization (the initiator) wishes to control or limit the authentication process.

Figure 5:
FIG. 5 is a screen shot of an embodiment of the invention.
Figure 6:
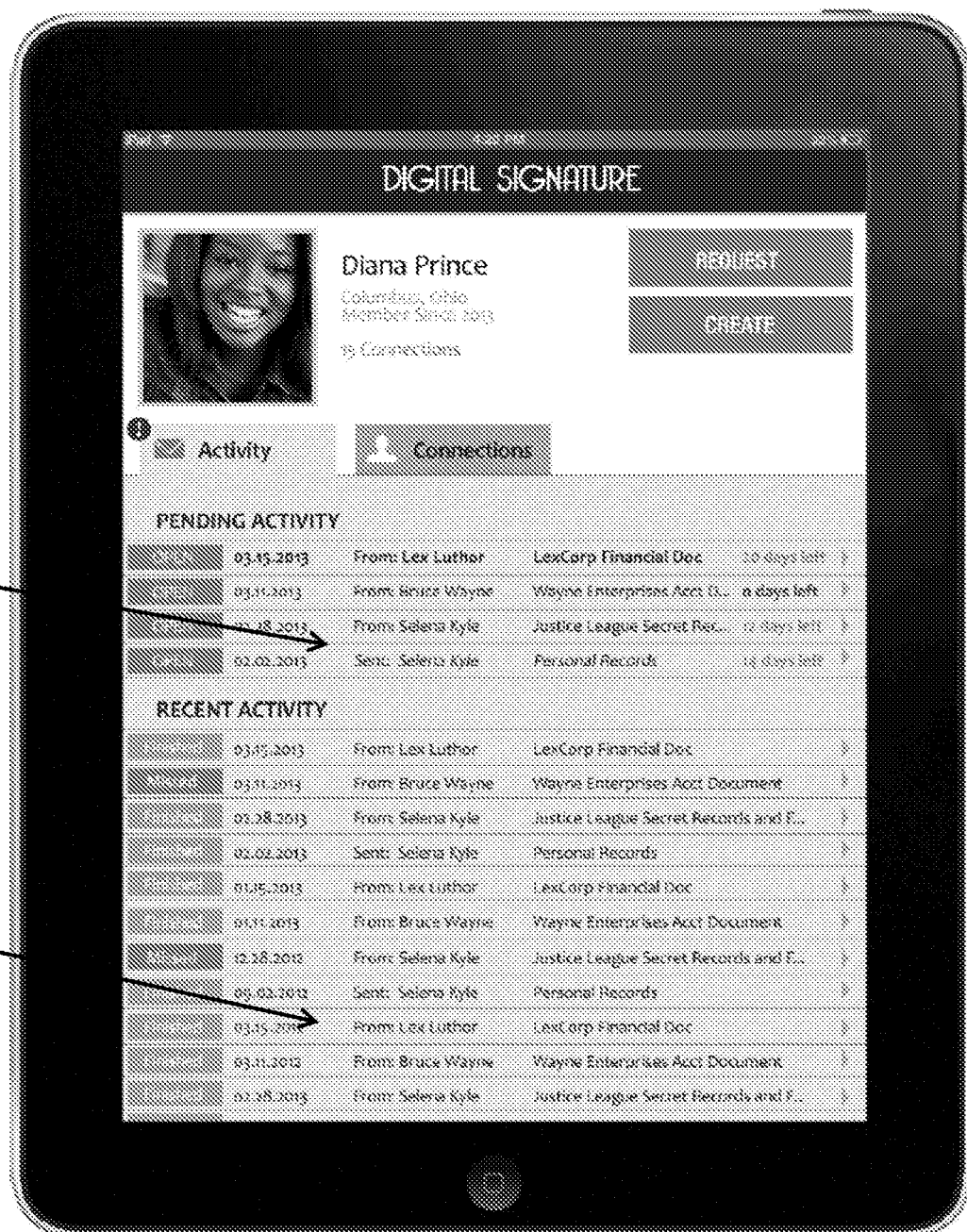
FIG. 6 is a screen shot of an embodiment of the invention.

An initiator may wish to have an acknowledgement authenticated. In such a circumstance, the initiator may utilize an embodiment of the invention to facilitate the authentication. In an embodiment of the invention, the initiator may communicate the desire of authenticating an acknowledgement to an embodiment of the invention as illustrated in FIG. 2 by logging into a server 200. As is shown in step 402 of FIG. 4a, the system may receive such request from the initiator. Upon receipt of the request, the system may determine whether the person or entity that the initiator wishes to have authenticated has an account on the system 404. If the system determines that there is no user account, the system may communicate 406 to the initiator, the person or entity that the initiator wishes to have authenticated, or both. The person or entity that the initiator wishes to have authenticated may then create an account and install any software required on their computing device. As will be described herein, various methods may be used to verify the identity of the person or entity when creating an account. Once an account is created 408, the person or entity being requested to authenticate an agreement may be considered to be a "user" as defined herein. The system may then communicate the authentication request to the user 410. Such a request may be communicated through such known methods as email, text, telephone, and other methods of communication to which a user may have access. In some embodiments of the invention, the system may communicate the request using the computing device 100 with which the authentication process is conducted. In such embodiments, a message or some other notification may be displayed by the computing device. As the result of this request, the computing device may then receive a connection or login request from the user. Alternatively, a user may be contacted by the initiator who requests the user to log into an embodiment of the invention. In either case, the user may attempt to log into a computing device 100 to begin the authentication process 412. An algorithm of the invention may determine if the user has previously registered the computing device that the user is using to perform the authentication process. If the user has not previously registered, the computing device may prompt the user to install any required software and authenticate the computer device if required by the embodiment of the invention. Embodiments of the invention may also prompt the user to enter additional identifying information such as address, email address, and telephone number. Such information may be used in embodiments of the invention to further identify the user through such methods as a two-step authentication and also allow the initiated or an administrator of the system to contact the user should additional information be required. After registering, or if the user had previously registered, the algorithm may prompt the user to enter a username and password. Upon receiving the user's input, an algorithm may verify that the information is correct before allowing the user to continue. An example logon screen is illustrated in FIG. 5. In step 414, a welcome screen may be displayed following a successful logon. An exemplary embodiment of such a welcome screen is illustrated in FIG. 6. As is shown, a user may be presented with a list of pending requests for acknowledgment activity 602 and also recent or past acknowledgment activity 604. If a user selects an activity, the algorithm may receive the user's input 416 and cause the selected activity to be displayed in a user interface of a computing device. Selecting a pending activity may allow the user to perform the requested authentication activity. Selecting a recent or past activity may allow the user to view detail of that activity.

Figure 7:
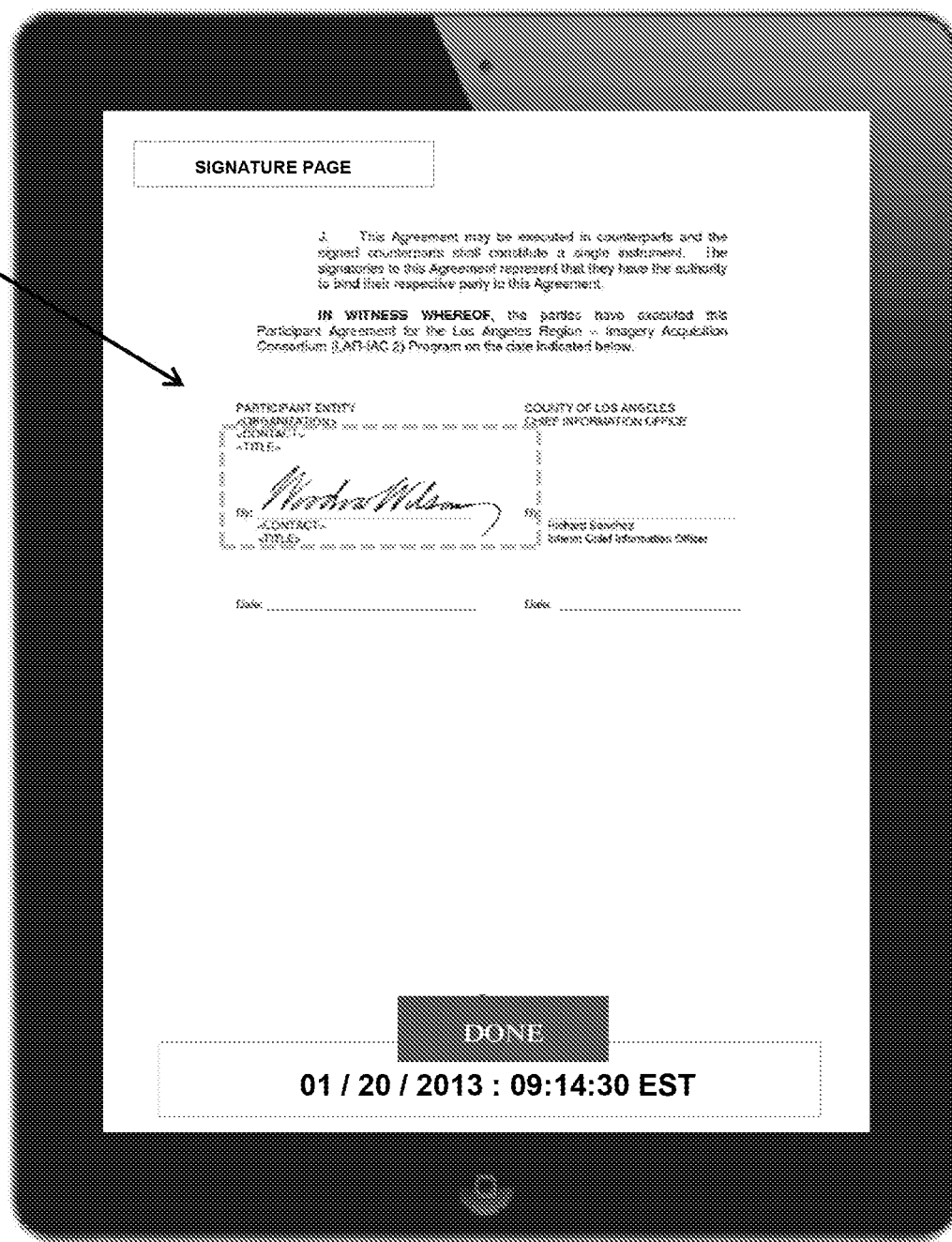
FIG. 7 is a screen shot of an embodiment of the invention.
Figure 8:
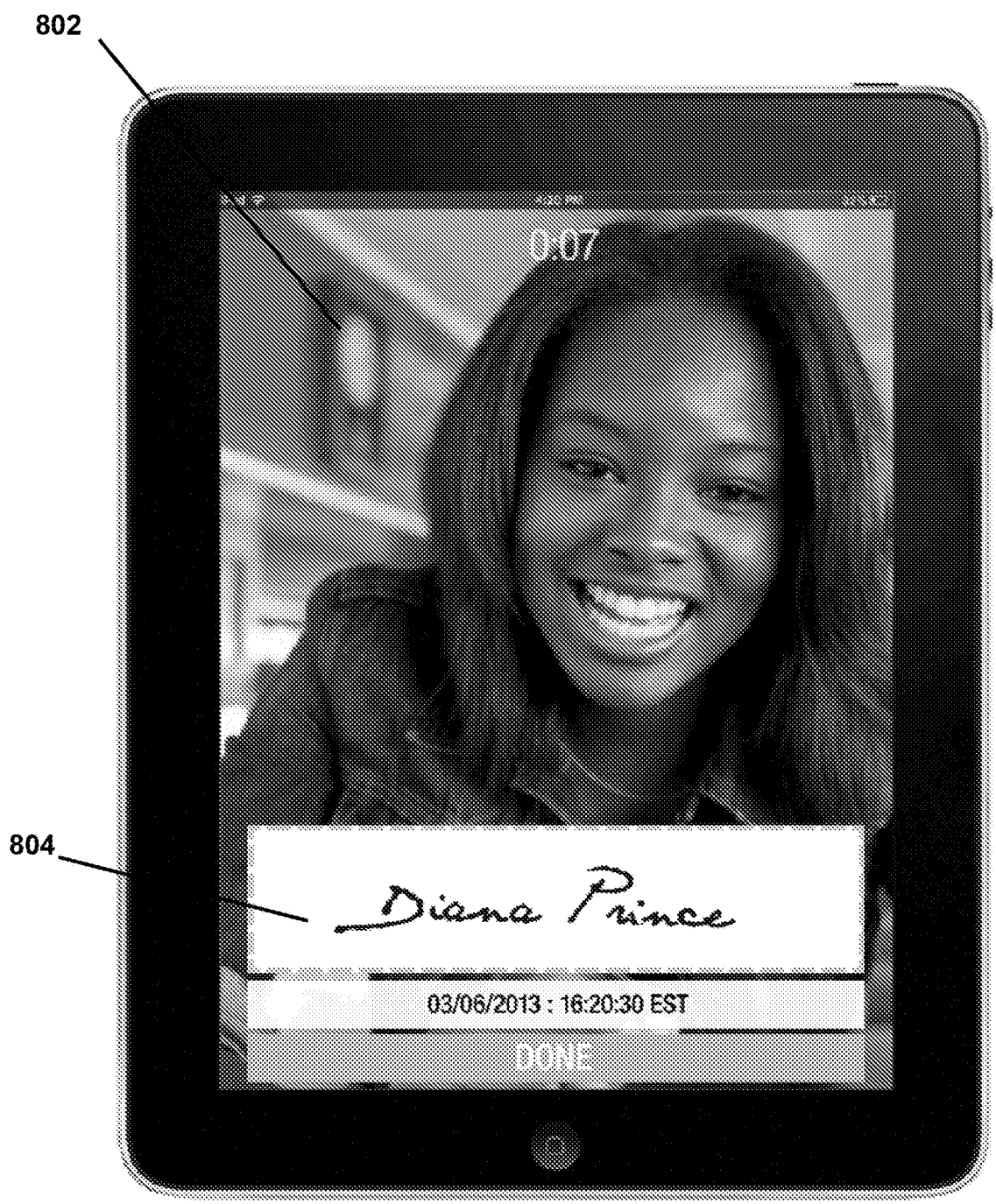
FIG. 8 is a screen shot of an embodiment of the invention.

FIG. 7 illustrates a user interface showing an example agreement 702 displayed on a tablet computer. In the illustrated example, the signature page of an agreement is shown. Embodiments of the invention may be configured to allow a user to scroll through the agreement for review. Referring again to FIG. 4a, step 418 represents the user being presented with an agreement for review. When the user is ready to acknowledge the agreement, the algorithm may receive an input from the user signifying that the user is ready to proceed with the acknowledgement process. The algorithm may initiate an image capture function using an image capture device 116 in electronic communication with the computing device 100. Such an image device may be integrated within the computing device, as is common in tablet and smart phone devices, or may be located externally as shown in FIGS. 2 and 3. As illustrated in the exemplary user interface shown in FIG. 8, the captured images may be displayed in a portion 802 of the user interface, allowing the user to view the image. An input field 804 may also be displayed in which an embodiment of the invention may receive an acknowledgment from the user. An area for a drawn or written signature is illustrated in FIG. 8 but such an acknowledgment may be received using other methods, including, but not limited to, a typed signature, a selectable checkbox, a simulated pushbutton, or a recording of a verbal acknowledgement.

In certain embodiments of the invention, the initiator may wish to have a record of a secondary image of the user to allow a viewer of the authentication data to easily determine that the user captured by the image capture device 116 is who they claim to be. One method of capturing such a secondary image may be through the use of a photo identification document such as a passport or driver's license. As is illustrated at step 420, if an initiator requests such a secondary image, an embodiment of the invention may check to see if the user has previously added a secondary image to their account. If not, a photo image may be uploaded 422 or in certain embodiments of the invention, captured using the image capture device 116.

In certain embodiments of the invention, during the process of sending a request for an acknowledgement to a user, an initiator may designate a date and time, at which point the initiator's offer to the user to acknowledge the sent item expires. Such a designation may have the effect of limiting the period of time during which a user may acknowledge or accept an offer described by the agreement.

In certain embodiments of the invention, an initiator may request that a user be allowed only a predetermined amount of time in which to acknowledge the agreement once the user starts the acknowledgment process. The acknowledgment process is a subset of the period of time that the user has to review, consider, and acknowledge the agreement. The acknowledgment process means that the user may have reviewed the item to be acknowledged and has actually started to perform the act of acknowledgment itself. For example, in an embodiment of the invention in which acknowledgement is accomplished by the entry of a signature by the user, the acknowledgment process may consist of an indication such as selecting a "start" button, using a finger or stylus to sign a touch sensitive input device, and pressing a "submit" button to cause the invention to store the signature and images captured by the image capture device 116. The predetermined time limitation may prevent fraudulent activity by requiring the user to perform the acknowledgement act within the predetermined timeframe. In embodiments which require that the acknowledgement process be completed within a predetermined time, the system may check to determine if the acknowledgement was actually completed within the predetermined time period 440. If the user has not successfully complete the acknowledgement process within the predetermined time, the system may restart the acknowledgement process at 424.

In certain embodiments of the invention, the initiator may require further verification that the acknowledgement process has been completed within the designated time frame. In such an embodiment, when the user begins the acknowledgement process, a time stamp may be captured on the user's device and sent to the initiator or a third party. When the acknowledgement process is completed, the acknowledgement record, including the captured verification records, may be sent to the initiator or third party for verification that the amount of time from when the acknowledgement process started until the time the acknowledgement record was transmitted to the initiator or third party does not exceed the amount of time designated by the initiator when the request for acknowledgement was sent.

To facilitate a limitation on the amount of time that a user has to perform the acknowledgement activity, in the example above, the entry of a signature, an embodiment of the invention may communicate to the user that there is a limited amount of time in which to act 424. An embodiment of the invention may capture a time stamp representing the start of the acknowledgement process 426. After the acknowledgement process is complete, such an embodiment may check to determine whether the process was completed within a predetermined time period 440. If the acknowledgement was not completed within the predetermined time, such an embodiment of the invention may notify the user and start the process again. Certain embodiments of the invention may be configured to allow only a limited number of attempts at verification.

To prevent a user from providing a pre-recorded authentication, the initiator may also require further verification that the user is the one who is acknowledging the agreement. An example of this further verification may be the generation of codes (either provided by the initiator or randomly generated by the system) and receipt of confirmation of these codes from the user at the beginning of the acknowledgement activity, at the end of the acknowledgement activity, or both. In step 436, the algorithm may prompt the user to enter the code in the form of characters entered from an input device 110. In such an embodiment, incorrect codes may result in an additional request to enter a code at step 432. In certain embodiments, a user may enter such a code verbally 434 while being recorded by the image capture device 116 to capture the verbalization of the code. When the user verbally enters the code, an embodiment of the invention may receive the acknowledgement input from the user before, during, or after capturing images of the user entering the code and performing the requested acknowledgement activity (signing, selecting a checkbox, etc.) 438. The determination of whether codes are entered verbally or by use of a keyboard device, touch screen, or other input device may be determined by the initiator. However, in some embodiments of the invention, the initiator may also have the option of allowing the user to make that decision at the time of providing confirmation of the codes.

If the initiator has requested that the user enter a confirmation code after the user performs the acknowledgement activity, an embodiment of the invention may generate a second random or initiator-defined code and prompt the user to enter that code 442. As with a code entered prior to an acknowledgment, a second code may be entered verbally 444 or entered using an input device 110 such as keyboard or other alpha numeric method 446. The entered code may be confirmed 448 to make sure that it matches what the user was prompted to enter. When an embodiment of the invention receives the acknowledgement from the user and any required code entries, the invention may store acknowledgement and authentication data 450 comprising the recorded images or videos, entered codes, and time stamps in a storage device 108, on a server 200 or some other storage medium for later retrieval. In an exemplary embodiment of the invention, such stored information may be communicated to the initiator or enable the user access to receive a good or service according to the acknowledged agreement.

In order to further identify the user, an embodiment of the invention may retrieve a unique identifier from the computing device used to perform the authentication process. Such an identifier may be, but is not limited to, a system serial number or network interface adapter number 428. Such an embodiment may require that a computer device be validated along with a user's account 430. Embodiments of the invention may organize and store acknowledgement and authentication data in a database to allow for later retrieval by an initiator, a user, or other interested parties who have been granted access to the data. Such embodiments may allow these parties to sort and retrieve the data to allow for rapid retrieval of acknowledgement data in order to identify an agreement or other acknowledged instrument and quickly access authentication data to confirm the identity of the user should there be a dispute over the authenticity of the acknowledgement.

Figure 9:
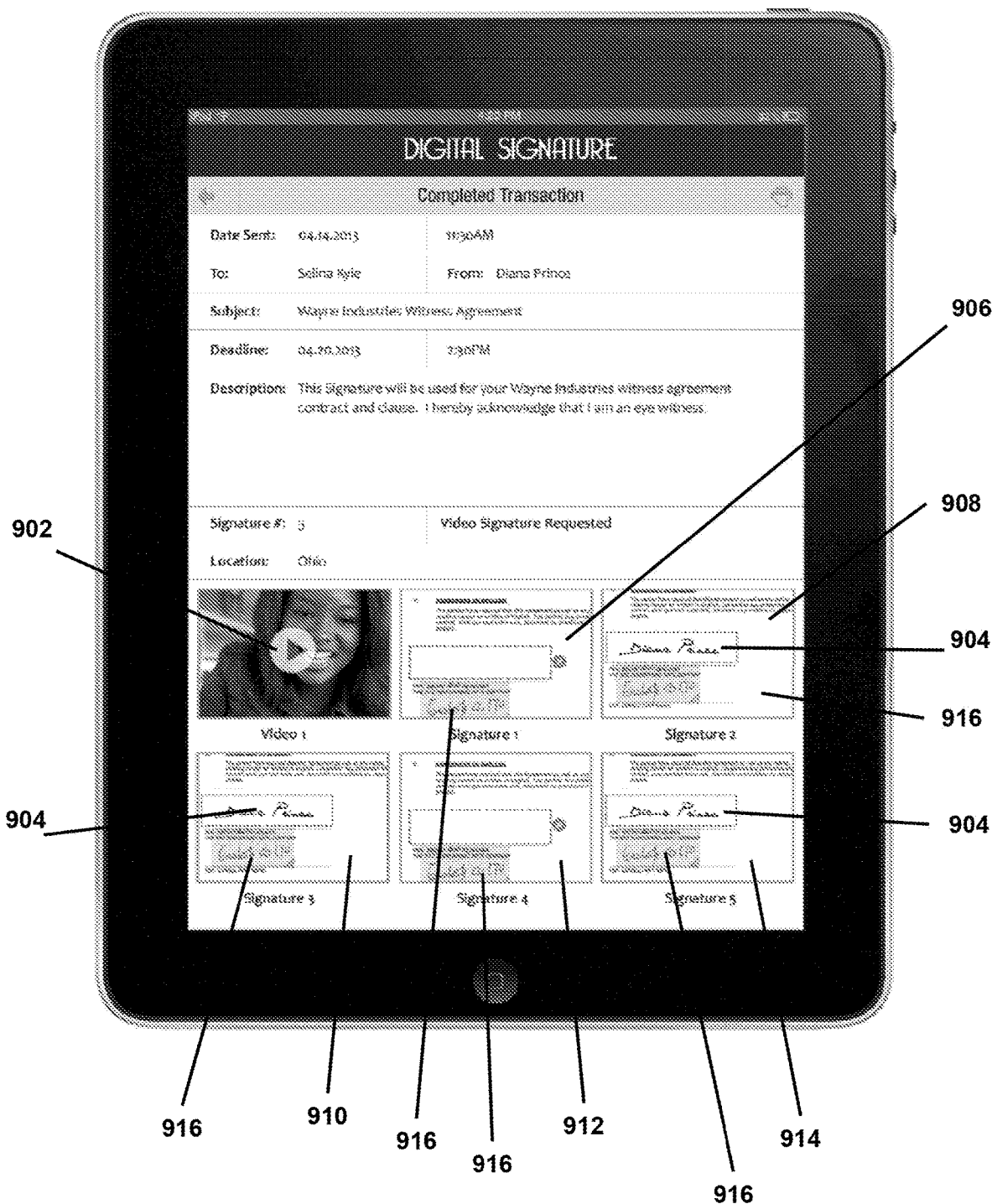
FIG. 9 is a screen shot of an embodiment of the invention.

A summary of the completed acknowledgement transaction may be provided should the initiator or another authorized party request authentication data. An example transaction summary to the initiator is shown in FIG. 9. A transaction summary may be provided via email or other communication method to the initiator and may include an image or video 902 of the user acknowledging the agreement. The communication may also include images of the acknowledgment 904. As is illustrated in FIG. 9, an embodiment of the invention may be configured to allow or require the user to acknowledge an agreement in multiple places 906, 908, 910, 912, and 914. For example, there may be a requirement that the user sign or initial each page of an agreement. In such a situation, an embodiment of the invention may generate a list of acknowledgments required and present that list using a user interface similar to FIG. 6 for each required acknowledgement. Alternately, an embodiment may present a user interface similar to FIG. 7 with a list of each additional section requiring acknowledgement. In such an embodiment, a user may be permitted to select from the list to authenticate the various sections. Embodiments may be configured to display an indication of those sections which require authentication and those for which authentication has been provided. In such embodiments, a user may be alerted if there are unacknowledged sections remaining when that user attempts to complete the acknowledgement process.

If the initiator requires that the user perform the acknowledgment activity within a certain time period and that time period has elapsed, the algorithm may notify the user that the predetermined time to acknowledge has expired and prompt the user to try again. In the event that a user is prompted to try again, the algorithm may configure the computing device to redisplay the agreement as shown in FIG. 7. Embodiments of the invention may be configured to limit the number of attempts by a user to perform the acknowledgment.

Figure 10:
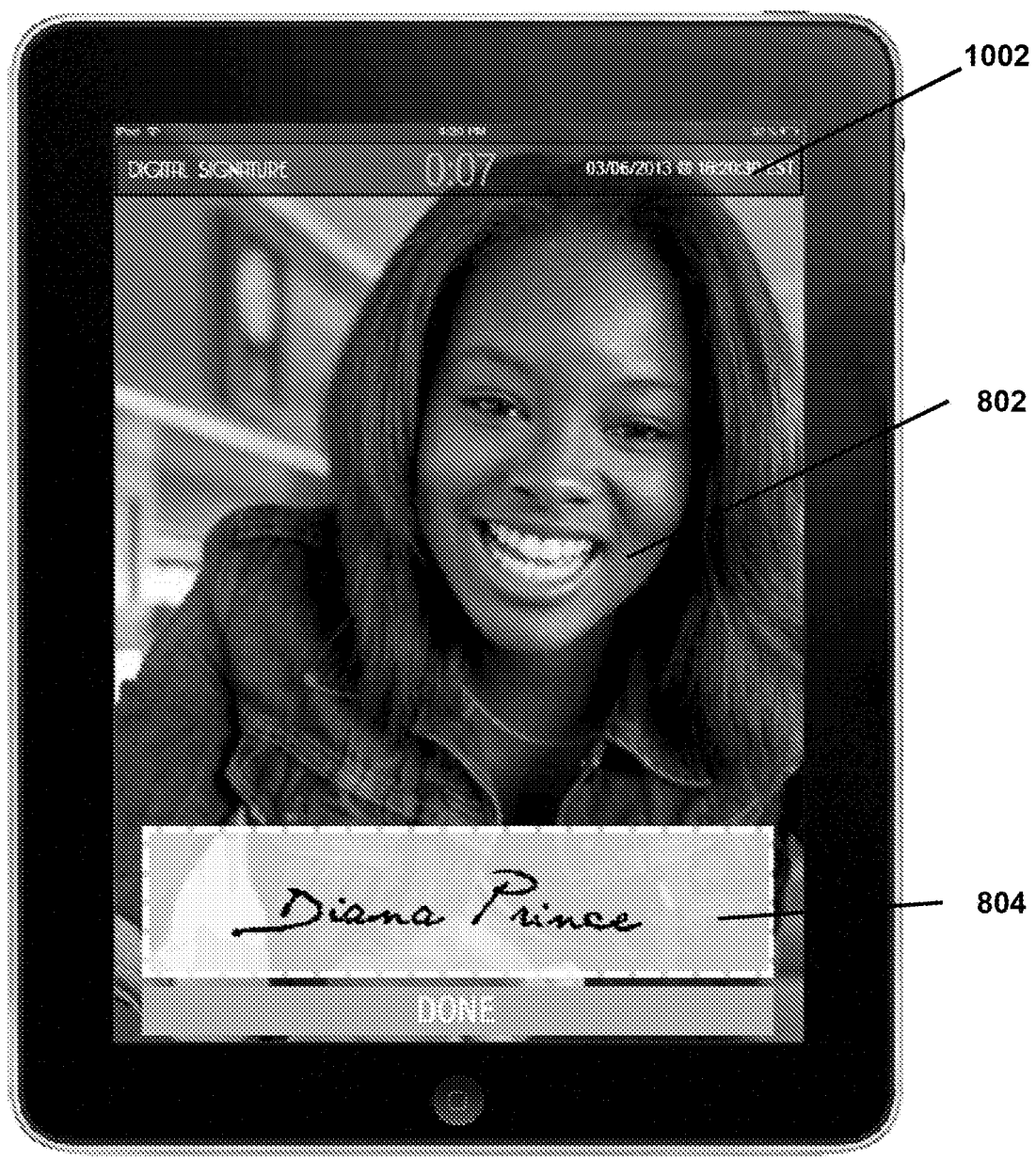
FIG. 10 is a screen shot of an embodiment of the invention.

Being able to observe their recorded image as well as the acknowledgment may assist the user in the acknowledgment process. As illustrated in FIG. 10, an embodiment of the invention may display a user interface which shows the captured user image portion 802, acknowledgment input field 804, and time stamp information 1002. Such a user interface may be displayed to the user while that user acknowledges the agreement in order to assist that user in the acknowledgment process. In certain embodiments of the invention, a similar user interface may be displayed to permit the initiator to observe the user's activities during the acknowledgment process.

In addition to functioning as a method of confirming the identity of a single user, embodiments of the invention may function to confirm the identity of a plurality of users. In such an embodiment, one or more computing devices may be configured to accept input from more than one user and combine all inputs into a communication to the initiator. In such embodiments, each user may be prompted to perform an acknowledgement activity as described in the flow chart of FIGS. 4a-4c. A communication to the initiator as the result of such an embodiment is illustrated as one or more acknowledgements 916 from a second user as shown in FIG. 9. One skilled in the art will realize that an embodiment of the invention may be configured such that the initiator is at least a second user. Such an embodiment may allow the initiator to acknowledge an agreement in conjunction with at least a first user's acknowledgment.

Off-Line Operation

In addition to configurations in which a computing device 100 is connected to a computer server 200, embodiments of the invention may be configured such that a computing device may receive agreement data and requirements from a computer server or second computing device at an earlier point in time during which the computing device is in communication with the computer server or second computing device. In such an embodiment, the computer device may perform the acknowledgment function at a later point in time without requiring a connection to a computer server or second computing device. Agreement and requirements data may be received using methods such as email, file transfer protocol (FTP), DropBox (DropBox.com), or other methods of receiving information remotely that are known to those ordinarily skilled in the art. An embodiment of the invention may execute an algorithm that configures a computing device to store acknowledgment information from the user according to requirements set forth in received agreement data. When the user has completed the acknowledgement process, the computing device may be configured to store the acknowledgment information. Such stored acknowledgement information may comprise an image or images, time stamp information, and a record of the method of acknowledgment including, but not limited to, an electronically captured signature, checkbox, "accept" pushbutton, or entered characters. Such stored information may be encrypted or otherwise protected to prevent a user or other party from tampering with the stored information. The computing device may also be configured to transmit the stored acknowledgment information to a computer server or second computing device when a connection to the computer server or second computing device becomes available.

Non-Login Operation

Creating a log-in profile in order to use a service such as described herein can be time consuming and result in frustration to those who wish to only occasionally use the service. The result may be that rather than creating the log-in, a potential customer may choose to seek goods or services elsewhere. In order to prevent the loss of a potential customer, an embodiment of the invention may be configured to allow a customer to acknowledge an agreement without registering or requiring a user log-in process. Such a customer may be considered to be an unregistered user. Referring to FIG. 4a, in such a configuration, the acknowledgment process may start at step 414. In such an embodiment, the invention may display a welcome screen, present an unregistered user with an agreement and request that the unregistered user acknowledge that agreement while images are captured of the acknowledgement. If an acknowledgement action is received from an unregistered user, an embodiment of the invention may be configured to allow the unregistered user to continue with a process of using a service or purchasing goods. In such an embodiment, data captured during the acknowledgment process comprising time stamps, images, device ID number, device location, and acknowledgment actions may be transmitted to a computer server or second computing device for use by a party providing services or goods that require authentication before a customer is allowed to access the services or goods.

Computer to Computer

In circumstances in which a computer server is not desirable, an embodiment of the invention may be configured to allow a first computing device to interact with a second computing device where each computing device may be executing a software embodiment of the invention. Such an embodiment is illustrated in FIG. 3. As is illustrated, a second computing device 101 may be operated by an initiator 205 and that computing device may receive instructions from the initiator that cause the second computing device to transmit a request for an acknowledgment to at least a first computing device 100. In certain embodiments, the process may also be reversed wherein the user sends a request to the initiator. As a result of a request for acknowledgment, the first computing device may then prompt a user 204 operating the first computing device to acknowledge an agreement. The first computing device may then receive such an acknowledgment from the user as if the first computing device were in electronic communication with a computer server as in other embodiments of the invention. Acknowledgment data may be transmitted from the first computing device to the second computing device for use by the initiator.

Video Acknowledgment

In addition to methods of acknowledgement comprising signatures, text, or selection of a button or checkbox, an embodiment of the invention may be configured to provide instructions to a user to verbally acknowledge an agreement. In such an embodiment, a computing device may be configured to instruct a user to verbally acknowledge an agreement while an image capture device records a video image and audio recording of the acknowledgment. These recordings may be transmitted to a computer server connected to the computing device where they can be used as a record of a user's acknowledgment in a manner similar to signatures, text, selection of a button, or checkbox used as a record of a user's acknowledgment in other embodiments of the invention. In embodiments of the invention which do not require a connection to a computer server or other computing device to perform the authentication function, the recording of the acknowledgment may be stored by the user's computer device for later transmission.

Location Restrictions

Figure 11:
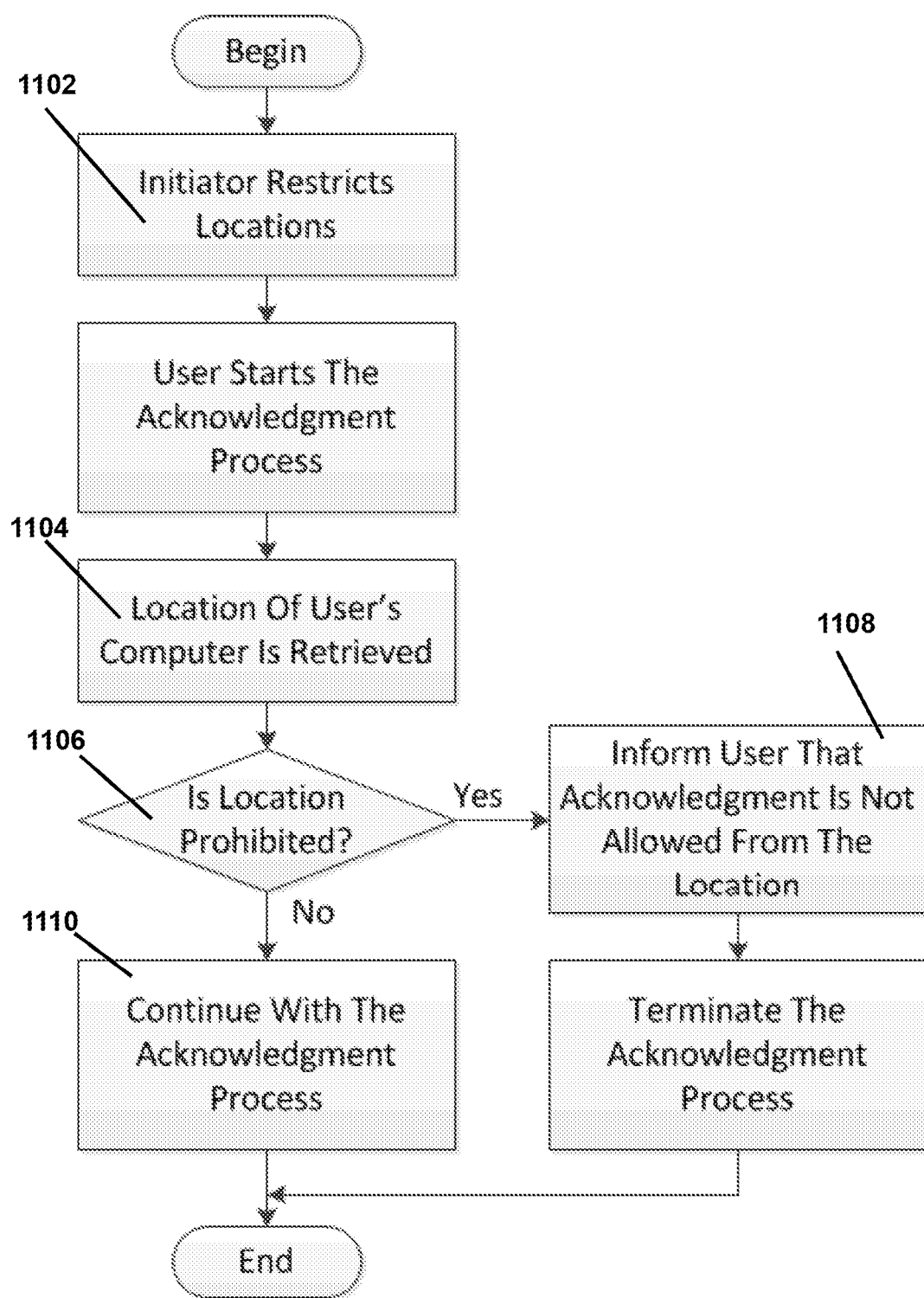
FIG. 11 is a flow chart of the process used to limit acknowledgments from undesired locations.

An initiator may wish to restrict access to the acknowledgment process to certain geographic locations. Such restrictions may enable the initiator to prevent a user from acknowledging or accepting an agreement from a geographic location from which the initiator does not wish to accept such an acknowledgment. An example of this may be a condition in which the user wishes to agree to the terms and conditions of a sports wagering web site. Use of such a web site may be prohibited in certain locations. An embodiment of the invention may be configured to prevent users who are located in such locations from performing the acknowledging process, thus helping to prevent a violation of the prohibition. As shown in the flow chart of FIG. 11, an initiator may select to limit acknowledgment from certain locations 1102. When a user connects a computing device to a server and attempts to start the acknowledgment process, the computing device may be configured to transmit the location of the computing device to the server 1104. In step 1106, the computer server may be configured to compare the transmitted location to a list of prohibited locations. If the location is found on the list of prohibited locations, the server may cause a message to be displayed on the user's computing device 1108, informing the user that accepting or assenting to the agreement is prohibited from that user's location. In such an embodiment, if the location is not prohibited, the user may be allowed to continue with the acknowledgment process 1110.

Device Validation

In an embodiment of the invention, an initiator may wish to control access to the acknowledgment process. One method of controlling that access may be performed by limiting the computing devices 100 used to those which have been previously authenticated. Authentication of the computing device may be performed during a user enrollment process. During such a process, a user may be required to perform the enrollment using the computing device that is to be authenticated. During the enrollment process, the computing device 100 may be configured to transmit information that uniquely identifies the user's computing device to a computer server 200 or other computing device. An example of information that uniquely identifies a computing device may be a serial number associated with the communications interface circuitry 114 of the computing device. In an embodiment of the invention, when a user attempts to perform the authentication process, the computing device may be instructed to allow a second computing device or computer server to read the unique identification number associated with the computing device. If the unique identification number does not match that which has previously been validated, the user may be prevented from performing the authentication process.

"Offer Valid" Time

In an embodiment of the invention, an initiator may wish to limit the time that a user has to accept or otherwise affirm an agreement. This differs from the time period to perform the acknowledgment process previously described in that a time to perform the acknowledgment process limits the amount of time that a user has to complete the acknowledgment once started, whereas a limit on the time a user has to accept or affirm may cause the agreement to expire if the user has not accepted or acknowledged the agreement within the time limit. In such an embodiment, the initiator may choose a time period beginning when the request for acknowledgement is initially sent, during which the agreement may be accepted. When a user initiates the acknowledgment process, an algorithm may check to see if there is a predetermined limit on the time which an agreement may be acknowledged. If the time period has elapsed or has not yet started, the algorithm may display a message to the user informing that user that the agreement is not available to be accepted.

Biometric Authentication

Additional methods of authenticating the user may be employed in embodiments of the invention. One such method may be the use of biometric information. In such embodiments of the invention, sensors such as a fingerprint reader may be placed in electronic communication with a computing device configured to perform the inventive algorithm. The fingerprint reader may be configured by a software algorithm to record the fingerprint from a user as that user acknowledges the terms of an agreement. In such an embodiment, the user's fingerprint may be stored in a storage device 108 along with other acknowledgment records such as time stamps, user images, and signature or other acknowledgment records. As additional biometric measurement technology becomes more widely available and cost effective, such functions as retina scanning or DNA sampling may also be implemented in embodiments of the invention.

Facial Recognition Authentication

Another additional method of authenticating a user in embodiments of the invention may employ facial recognition technology. In such an embodiment, images of the user captured during the acknowledgment process may be compared to previous images of the user using facial recognition software. Such previous images of the user may comprise images from a registration or enrollment process or may be images obtained from sources including, but not limited to, public records, employment data, social media, and operator's license images.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of authenticating an electronic acknowledgement of an item to be acknowledged, the method comprising:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user during an acknowledgement process;

receiving an image of an identification document associated with the user;

comparing the captured at least one image of the user to the image of the identification document associated with the user to authenticate the user's identity;

measuring a time period that elapses from a time when the at least one item is displayed to a time of receiving the input representing the user's electronic acknowledgement of the at least one item; and notifying the user if the time period exceeds a predefined time limit;

wherein the acknowledgement process extends at least from the time of receiving the input to the capturing step.

2. A computerized method of authenticating the electronic acknowledgement of an item comprising the steps of:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user during an acknowledgement process;

comparing the captured at least one image of the user to an image of an identification document previously stored on a second computerized device, which identification document is associated with the user to authenticate the user's identity;

measuring a time period that elapses from a time when the at least one item is displayed to a time of receiving the input representing the user's electronic acknowledgement of the item and authenticating the user; and notifying the user if the time period exceeds a predefined time limit;

wherein the acknowledgement process extends at least from the time of receiving the input to the capturing step.

3. A computerized method of authenticating the electronic acknowledgement of an item comprising the steps of:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user;

receiving an image of an identification document associated with the user;

comparing the captured at least one image of the user to the image of the identification document associated with the user to authenticate the user's identity;

displaying on the display device an alphanumeric code;

receiving from the user a response using the input device of the first computerized device; and comparing the alphanumeric code to the user's response to determine whether the user's response is the alphanumeric code.

4. A computerized method of authenticating the electronic acknowledgement of an item comprising the steps of:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user;

comparing the captured at least one image of the user to an image of an identification document previously stored on a second computerized device that is associated with the user to authenticate the user's identity;

displaying on the display device an alphanumeric code;

receiving from the user a response using an input device on the first computerized device; and comparing the alphanumeric code to the user's response to determine whether the user's response is the alphanumeric code.

5. A computerized method of authenticating the electronic acknowledgement of an item comprising the steps of:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user;

receiving an image of an identification document associated with the user;

comparing the captured at least one image of the user to the image of the identification document associated with the user to authenticate the user's identity;

displaying on the display device an alphanumeric code;

receiving from the user a spoken response using an audio capture device on the first computerized device; and comparing the alphanumeric code to the user's spoken response to determine whether the user's spoken response is the alphanumeric code.

6. A computerized method of authenticating the electronic acknowledgement of an item comprising the steps of:

displaying at least one item to be electronically acknowledged on a display device of a first computerized device;

configuring an input device of the first computerized device to receive an input from a user;

receiving from the user, using the input device of the first computerized device, an input representing the user's electronic acknowledgement of the at least one item;

capturing, using an image capture device of the first computerized device, at least one image of the user;

comparing the captured at least one image of the user to an image of an identification document previously stored on a second computerized device that is associated with the user to authenticate the user's identity;

displaying on the display device an alphanumeric code receiving from the user a spoken response using an audio capture device on the first computerized device; and comparing the alphanumeric code to the user's spoken response to determine whether the user's spoken response is the alphanumeric code.

7. A computerized method of authenticating the electronic acknowledgement of an item comprising the steps of:

displaying at least one item to be electronically acknowledged on a display device of a first computerized device;
configuring an input device of the first computerized device to receive an input from a user;
receiving from the user, using the input device of the first computerized device, an input representing the user's electronic acknowledgement of the at least one item;
capturing, using an image capture device of the first computerized device, at least one image of the user;
receiving an image of an identification document associated with the user;
comparing the captured at least one image of the user to the image of the identification document associated with the user to authenticate the user's identity;
displaying to the user on the display device a code in the form of instructions to perform a specific body movement;
receiving a response from the user using a video capture device on the first computerized device; and
comparing the displayed code to the user's response to determine whether the user's response is the displayed code.

8. A computerized method of authenticating the electronic acknowledgement of an item comprising the steps of:
displaying at least one item to be electronically acknowledged on a display device of a first computerized device;
configuring an input device of the first computerized device to receive an input from a user;
receiving from the user, using the input device of the first computerized device, an input representing the user's electronic acknowledgement of the at least one item;
capturing, using an image capture device of the first computerized device, at least one image of the user;
comparing the captured at least one image of the user to an image of an identification document previously stored on a second computerized device that is associated with the user to authenticate the user's identity;
displaying to the user on the display device a code in the form of instructions to perform a specific body movement;
receiving a response from the user using a video capture device on the first computerized device; and
comparing the displayed code to the user's response to determine whether the user's response is the displayed code.

\* \* \* \* \*